UNITED STATES PATENT OFFICE.

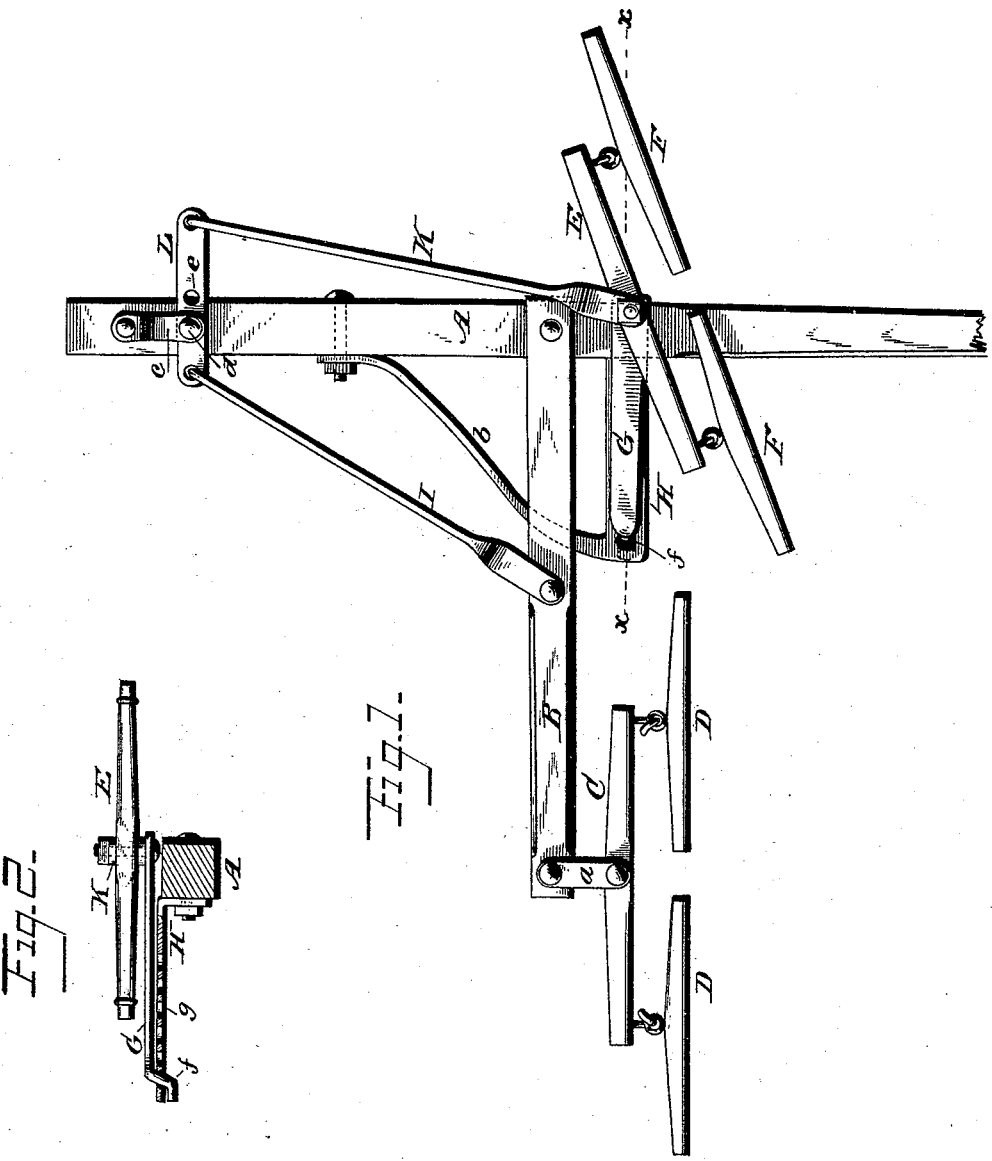

HARRISON DICKEY, OF PIPESTONE, MINNESOTA.

DRAFT-EQUALIZER.

SPECIFICATION forming part of Letters Patent No. 499,522, dated June 13, 1893.

Application filed March 23, 1893. Serial No. 467,393. (No model.)

*To all whom it may concern:*

Be it known that I, HARRISON DICKEY, a citizen of the United States, residing at Pipestone, in the county of Pipestone and State of Minnesota, have invented certain new and useful Improvements in Draft-Equalizers; and I do hereby declare that the following is a full, clear, and exact description of the same, reference being had to the annexed drawings, making a part of this specification, and to the letters of reference marked thereon.

The present invention has for its object to provide an equalizer for heavy draft such as would be used on harvesters and binders, or other heavy agricultural machines, that can be conveniently changed to adapt it to three or four horses, and the invention consists in the several details of construction substantially as shown in the drawings and hereinafter described and claimed.

Figure 1 of the drawings represents a plan view of my improved equalizer; Fig. 2 a detail sectional view taken on line $xx$ of Fig. 1.

In the accompanying drawings A represents the tongue or pole to which is pivoted one end of an evener-bar B, the opposite or outer end of said bar having connected to it the doubletree C by means of a suitable clip $a$, and to this doubletree are suitably connected the singletrees D. The doubletree E which carries the singletrees F is suitably pivoted to a short evener-bar G which is removably and adjustably connected to a supporting arm H, said arm being suitably connected to the tongue or pole A and having a brace $b$ which is also connected thereto in like manner. Rods I K connect respectively the evener-bars B G with the bar L, said bar being pivotally and adjustably connected to the tongue or pole A by means of the clip $c$ and pin $d$.

In the drawings is shown the equalizer as adapted for four horses, and to change it so that three horses may be used, the bar L is adjusted by engaging the pin or bolt $d$ with the hole $e$ in said bar and thus bringing it in the center thereof. The singletrees D are now removed and the doubletree C used as a singletree. To regulate the draft-bar when found necessary, the evener-bar G is adjusted either to the right or left as the case may be and the hook $f$ thereon engaged with one of the holes $g$ in the supporting arm H.

Having now fully described my invention, what I claim as new, and desire to secure by Letters Patent, is—

In a draft-equalizer, the combination with the tongue or pole and the doubletrees and singletrees, of the evener-bars, a bar pivotally and adjustably connected to the tongue or pole, rods connecting it with the evener-bars, a hook upon the end of one of the evener-bars and a supporting-arm having holes with which said hook engages, substantially as and for the purpose set forth.

In testimony that I claim the above I have hereunto subscribed my name in the presence of two witnesses.

HARRISON DICKEY.

Witnesses:
 F. W. TURNER,
 A. HITCHCOX.